(12) United States Patent
Lee et al.

(10) Patent No.: US 11,529,879 B2
(45) Date of Patent: Dec. 20, 2022

(54) ELECTRIC VEHICLE RAPID CHARGING APPARATUS HAVING SENSOR FOR CONTROLLING AUTOMATIC PULL-OUT OF CHARGING CABLE

(71) Applicant: KLINELEX CO., LTD., Uiwang-si (KR)

(72) Inventors: Hyo Young Lee, Seoul (KR); Seog Bae Heo, Yongin-si (KR); Jong Won Lim, Gwacheon-si (KR)

(73) Assignee: KLINELEX CO., LTD., Uiwang-si (KR)

( * ) Notice: Subject to any disclaimer, the term of this patent is extended or adjusted under 35 U.S.C. 154(b) by 0 days.

(21) Appl. No.: 17/637,517

(22) PCT Filed: Sep. 24, 2020

(86) PCT No.: PCT/KR2020/012921
§ 371 (c)(1),
(2) Date: Feb. 23, 2022

(87) PCT Pub. No.: WO2021/066386
PCT Pub. Date: Apr. 8, 2021

(65) Prior Publication Data
US 2022/0297551 A1    Sep. 22, 2022

(30) Foreign Application Priority Data

Oct. 4, 2019 (KR) .................... 10-2019-0123072
Mar. 11, 2020 (KR) .................... 10-2020-0030045

(51) Int. Cl.
*H02J 7/00* (2006.01)
*H02J 7/14* (2006.01)
(Continued)

(52) U.S. Cl.
CPC ............... *B60L 53/11* (2019.02); *B60L 53/16* (2019.02); *B60L 53/18* (2019.02)

(58) Field of Classification Search
CPC ........... B60L 53/11; B60L 53/16; B60L 53/18
(Continued)

(56) References Cited

U.S. PATENT DOCUMENTS 8,561,737 B2    10/2013   Ichikawa
2012/0048983 A1*   3/2012   Bianco ................... B60L 53/18
                                                       242/388.9
(Continued)

FOREIGN PATENT DOCUMENTS

CN      107310421 A  * 11/2017
JP      2014180121       9/2014
(Continued)

*Primary Examiner* — Alexis B Pacheco
(74) *Attorney, Agent, or Firm* — Lex IP Meister, PLLC

(57) ABSTRACT

The present disclosure relates to an electric vehicle rapid charger equipped with a sensor for controlling an automatic pull-out of a charging cable. The electric vehicle rapid charger according to an embodiment of the present disclosure includes: a main body including a connector holder provided on one side of the main body and a cable connection part provided at a first predetermined height; a cable inlet/outlet part including a plurality of rotating rollers and fixedly coupled to the main body at a second predetermined height; a charging cable having a leading end portion in which a connector connected to a connection inlet of an electric vehicle is provided, a rear end portion fixedly coupled to the cable connection part, and an intermediate portion coupled to the cable inlet/outlet part to be inserted between the plurality of rotating rollers; and a control part configured to control a driving of the cable inlet/outlet part according to a charging request signal or a charging stop signal. The cable inlet/outlet part includes guide pins arranged on a front side or a rear side of the plurality of (Continued)

rotating rollers to guide the charging cable to move between the plurality of rotating rollers at a normal position, and is configured to continuously discharge or collect the charging cable by a driving of the plurality of rotating rollers.

3 Claims, 4 Drawing Sheets

(51) Int. Cl.
 B60L 53/10 (2019.01)
 B60L 53/16 (2019.01)
 B60L 53/18 (2019.01)
(58) Field of Classification Search
 USPC .................................................. 320/107, 104
 See application file for complete search history.

(56) References Cited

U.S. PATENT DOCUMENTS

| | | | | |
|---|---|---|---|---|
| 2012/0249066 | A1* | 10/2012 | Ichikawa | B60L 3/00 320/109 |
| 2014/0175211 | A1* | 6/2014 | Mizuno | B65H 75/4481 242/390.1 |
| 2014/0224914 | A1* | 8/2014 | Sugiura | F16H 7/00 242/379 |
| 2015/0343912 | A1* | 12/2015 | McNally | B60L 53/305 320/109 |
| 2016/0075251 | A1* | 3/2016 | Choi | B60L 53/16 320/109 |
| 2016/0121747 | A1* | 5/2016 | Jefferies | H01H 3/16 320/109 |
| 2016/0207408 | A1* | 7/2016 | Bianco | B60L 53/16 |
| 2017/0129351 | A1* | 5/2017 | Bianco | B60L 53/16 |
| 2017/0267114 | A1* | 9/2017 | Bianco | H02J 7/0013 |
| 2018/0272880 | A1* | 9/2018 | Bianco | B60L 53/30 |
| 2019/0118671 | A1* | 4/2019 | Helnerus | B60L 53/16 |
| 2019/0217715 | A1* | 7/2019 | Christen | G03B 29/00 |
| 2022/0111745 | A1* | 4/2022 | Koehler | B60L 53/30 |

FOREIGN PATENT DOCUMENTS

| | | |
|---|---|---|
| JP | 2014212609 | 11/2014 |
| KR | 101608380 | 4/2016 |
| KR | 20180001337 | 5/2018 |
| KR | 20180106230 | 10/2018 |

* cited by examiner

ELECTRIC VEHICLE RAPID CHARGING APPARATUS HAVING SENSOR FOR CONTROLLING AUTOMATIC PULL-OUT OF CHARGING CABLE

TECHNICAL FIELD

The present disclosure relates to an electric vehicle rapid charger equipped with a sensor for controlling an automatic discharger-collection of a charging cable.

BACKGROUND

In recent years, with the global trend of strengthening environmental regulations and reducing energy costs, the demand for an environmentally friendly electric vehicle is increasing. In order to widely provide such an electric vehicle, it is indispensable to build a charging infrastructure that may charge a battery of the electric vehicle.

An electric vehicle charger is an apparatus for feeding electrical energy supplied from a power source to the battery of the electric vehicle, which includes an electric charging control device configured to feed the electrical energy supplied from the power source to the battery of the electric vehicle, a charging guide display for monitoring a charging state of the electrical energy, and a charging cable for connecting the electric vehicle charger to the battery of the electric vehicle.

In such an electric vehicle charger, when a charging connector provided at an end portion of the charging cable is connected to a connecting inlet installed in the electric vehicle, the electric energy is fed to the battery of the electric vehicle. The charging cable has a length of about 3 to 7 meters. In general, the charging cable is arranged and held while being wound around or placed on a holder provided at one side of the charger. To charge the electric vehicle, the user draws out the charging cable wound around the holder.

At this time, a portion of the middle portion of the drawn-out charging cable may be brought into contact with the ground due to its drawn-out length. The portion in contact with the ground may be worn out or damaged as the charging cable is repeatedly used. In addition, the charging cable may be contaminated by contaminants on the ground. When the damaged portion of the charging cable as described above is repeatedly left on the ground, an electrical safety accident may occur. In addition, there is a matter that the user may feel discomfort due to the contaminated portion.

As an approach for solving the aforementioned matters, Korean Registration Patent No. 10-1608380 (Patent Document 1) discloses a charging control module. In the charging control module disclosed in Patent Document 1, a charging cable wound around a rotation shaft of a cable reel is configured to be discharged while being unwound from the rotation shaft, and to be collected while being wound around the rotation shaft again.

However, the charging control module disclosed in Patent Document 1 may be applied merely to a slow charging device in which a thin cable is used. In order for the cable to be easily wound around a circular reel, the cable needs to have a small diameter of about 10 mm or less. However, a cable to be applied to a rapid charging device has a relatively large diameter of 30 mm or more. This makes it difficult for the cable to be smoothly wound around the circular reel.

In addition, in recent years, as the use of ultra-rapid or rapid charger increases, a charging cable uses a thick power line suitable for large power transmission, and an additional cooling line for cooling the power line is also provided inside the charging cable. As described above, since the charging cable applied to the ultra-rapid or rapid charger has a thick diameter and a heavy weight, it requires considerable effort and force to draw out the charging cable from the charger and return the same to its original position after use. In particular, in recent years, in a situation in which the number of female drivers or elderly drivers is increasing, it is difficult for the drivers to handle such a thick and heavy charging cable. This causes a matter that makes the widespread use of ultra-rapid or rapid charger difficult.

Further, as an approach for preventing a charging cable of a rapid charger from coming in contact with the ground or dragging on the ground, Korean Utility Model Publication No. 20-20180001337 (Patent Document 2) discloses an automatic reel apparatus for electric vehicle charger. The automatic reel apparatus for electric vehicle charger disclosed in Patent Document 2 is configured such that a charging cable is held by a main body structure while being connected to a spring balance (wire) and is discharged or collected by virtue of a tensile force of the spring balance.

However, in the automatic reel apparatus for electric vehicle charger disclosed in Patent Document 2, since the charging cable is discharged using the spring balance, the user needs to pull the charging cable with a force stronger than the tensile force of the spring balance in addition to the weight of the charging cable itself. For that reason, it may be difficult for the elderly and weak person to handle the charging cable. In addition, the charging cable using the spring balance is continuously pulled by the spring balance during charging. As a result, the charging cable may be easily damaged and a connection error between a connector and a connection inlet may occur frequently. In severe cases, the risk of damage to the connection inlet is very high.

Therefore, there is a great demand for a rapid charger which is capable of being easily used even by an elderly driver while preventing a charging cable from coming in contact with the ground, securing safety of use of the charging cable, and easily storing and arranging the charging cable.

SUMMARY

The present disclosure was made for the purpose of solving the above matters, and the present disclosure is for the purpose of providing an electric vehicle rapid charger which is capable of being more easily used even by a relatively weaker user while preventing a charging cable from coming in contact with the ground.

Further, the present disclosure is for the purpose of providing an electric vehicle rapid charger which is capable of easily implementing a connection between a connector of a charging cable and a connection inlet of an electric vehicle, stably maintaining the connection during a charging process, thereby ensuring safety of use of the charging cable.

Further, the present disclosure is for the purpose of providing an electric vehicle rapid charger with a charging cable automatic alignment structure in which a charging cable is automatically discharged and collected according to whether or not an electric vehicle is connected to the rapid charger, or whether or not a charging process is completed.

Further, the present disclosure is for the purpose of providing an electric vehicle rapid charger which is configured to guide a charging cable to be discharged and collected in a correct direction, thereby allowing the charging cable to be easily and stably discharged and collected with little load.

An electric vehicle rapid charger of an example embodiment, which is provided to solve the aforementioned matters, includes: a main body including a connector holder provided on one side of the main body and a cable connection part provided at a first predetermined height; a cable inlet/outlet part including a plurality of rotating rollers and fixedly coupled to the main body at a second predetermined height; a charging cable having a leading end portion in which a connector connected to a connection inlet of an electric vehicle is provided, a rear end portion fixedly coupled to the cable connection part, and an intermediate portion coupled to the cable inlet/outlet part to be inserted between the plurality of rotating rollers; and a control part configured to control a driving of the cable inlet/outlet part according to a charging request signal or a charging stop signal, wherein the cable inlet/outlet part includes guide pins arranged on a front side or a rear side of the plurality of rotating rollers to guide the charging cable to move between the plurality of rotating rollers at a normal position, and is configured to continuously discharge or collect the charging cable by a driving of the plurality of rotating rollers.

Further, in an example embodiment, the charging cable may be coupled to the cable connection part and the cable inlet/outlet part to extend downward between the cable connection part and the cable inlet/outlet part at a predetermined length, and may be configured such that a portion of the charging cable having the downwardly-extended length is moved upward from an original position to be discharged to the front side of the main body and the portion of the charging cable is moved downward again to be collected to the origin position.

Further, in an example embodiment, the cable inlet/outlet part may further include a sensor module configured to sense a length at which the charging cable is discharged or collected such that the charging cable is discharged or collected within a certain range of length.

Further, in an example embodiment, the sensor module may include a color sensor coupled to the cable inlet/outlet part and a color portion formed in a surface of the charging cable.

Further, in an example embodiment, the guide pins may include a pair of vertical guide fins arranged on right and left sides of the charging cable to prevent the charging cable from being displaced in a lateral direction, and a pair of horizontal guide fins arranged on upper and lower sides of the charging cable to prevent the charging cable from being displaced in a vertical direction.

Further, in an example embodiment, the rapid changer for electric vehicle may further include: a sensor part including a first sensor configured to sense a coupling between the connector of the charging cable and the connector holder of the main body, and a second sensor configured to sense a coupling between the connector of the charging cable and the connection let of the electric vehicle, the sensor part being configured to sense the charging request signal or the charging stop signal when using the charging cable, wherein the control part may control the driving of the cable inlet/outlet part based on the charging request signal or the charging stop signal sensed by the sensor part.

Further, in an example embodiment, the sensor part may further include a timer configured to sense a discharge time or a collection time of the charging cable, and when a time set in the timer elapses, the control part may control the driving of the cable inlet/outlet part such that the charging cable is not discharged or collected.

The electric vehicle rapid charger of the present example embodiment has an effect of improving usability of a charging cable by a weak user by allowing the charging cable to be automatically discharged and collected in response to a charging request signal or a charging stop signal.

Further, the electric vehicle rapid charger of the present example embodiment has an effect of preventing a charging cable from coming in contact with the ground in a charging process, thus suppressing occurrence of contamination and improving safety of use of the charging cable.

Further, in the electric vehicle rapid charger of the present example embodiment, no external force is applied to a charging cable even in a charging process. This provides an effect of stably maintaining a connection state and thus improving safety of use of the charging cable.

Further, in the electric vehicle rapid charger of the present example embodiment, a charging cable may be held at a normal position even if the charging cable is repeatedly discharged and collected. This provides an effect of improving safety of use of the charging cable and durability of the charging cable.

DETAILED DESCRIPTION

The present disclosure and technical matters to be solved by implementing the present disclosure will become more apparent by preferred embodiments of the present disclosure which will be described later. Hereinafter, the preferred example embodiments of the present disclosure will be described with reference to the accompanying drawings.

Figure 1:
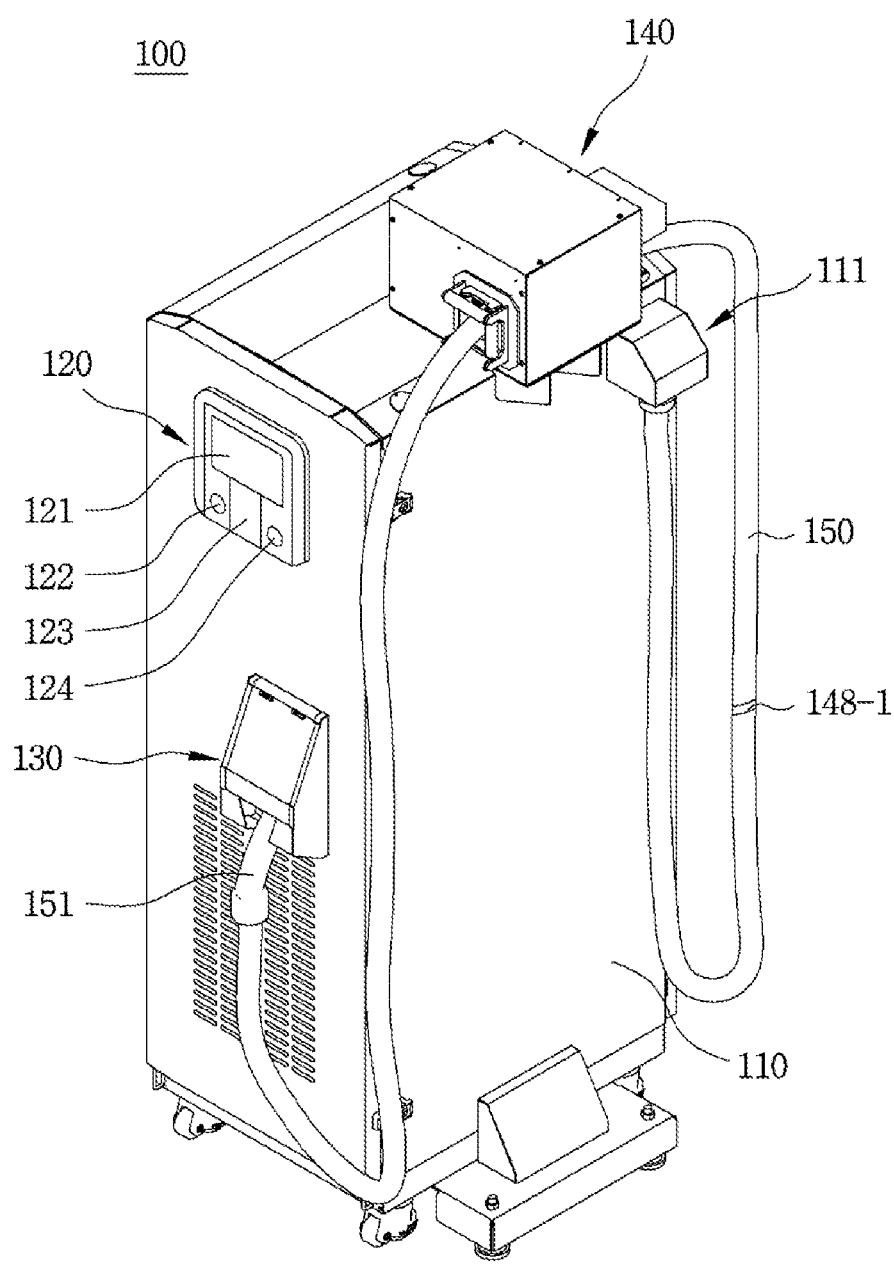
FIG. 1 is a perspective view illustrating a rapid charger according to an example embodiment.
Figure 2:
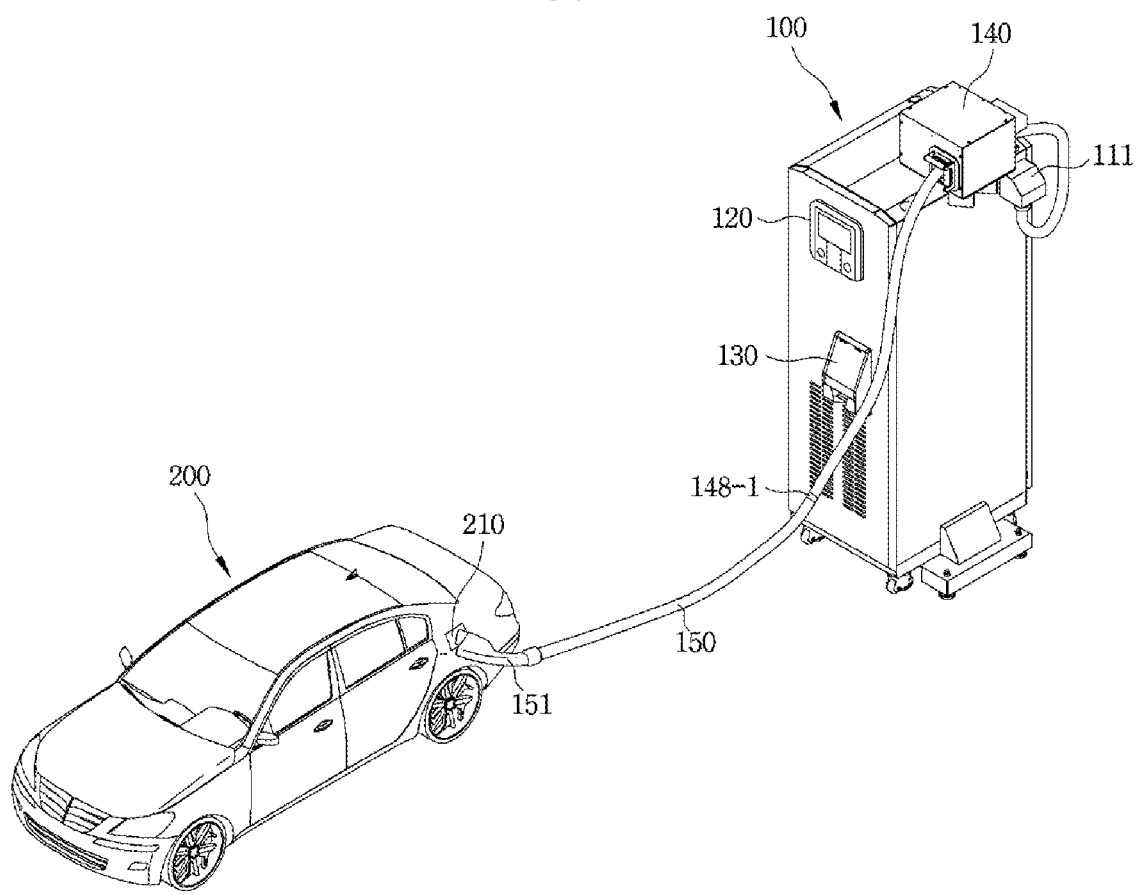
FIG. 2 is a perspective view illustrating a state in which the rapid charger of FIG. 1 is connected to an electric vehicle.

FIG. 1 is a perspective view illustrating a rapid charger according to this example embodiment, and FIG. 2 is a perspective view illustrating a state in which the rapid charger of FIG. 1 is connected to an electric vehicle.

First, referring to FIG. 1, an electric vehicle rapid charger 100 of the present example embodiment is a stand-type charger installed in a parking lot or a charging station of multiple houses or public facilities, which is an apparatus connected to an external power source so as to feed power through a cable. The electric vehicle rapid charger 100 includes a main body 110 having a predetermined shape, a user operation part 120 installed on a front surface of the main body 110, a connector holder 130 installed on one side of the main body 110, a cable inlet/outlet part 140 installed on the other side of the main body 110, and a charging cable 150 having one end portion connected to the main body 110 to feed power. Further, various control modules (not illustrated) for feeding the power are provided inside the main body 110.

Specifically, the main body 110 has an accommodation space defined therein, functions as an outer casing of the electric vehicle rapid charger 100, and connects between the user operation part 120, the connector holder 130 and the cable inlet/outlet part 140. The main body 110 may be made of a metal material or a non-metallic material having a relatively high rigidity and may be formed in a hexahedral shape having a certain height. The main body 110 may be formed in various shapes in conformity to a position at which the electric vehicle rapid charger 100 is installed. In particular, the main body 110 preferably has such a height that the charging cable 150 connected to the main body 110 does not contact with the floor. The cable connection part 111 is provided at a position having a certain height.

The user operation part 120 is configured to be positioned on the front side of the main body 110 for user's operation, and may include a display screen 121 for notifying charging information as a video, an audio output unit 122 for notifying the charging information as an audio, a payment unit 123 for paying a charging fee, and an emergency button unit 124 used at the time of occurrence of emergency situation.

The display screen 121 may be constituted with a normal touch panel that enables a touch operation. The payment unit 123 may be provided to be operated in a touch manner using the display screen 121, a tag manner using RFID (Radio Frequency Identification), an insertion manner using a card reader, or the like. The audio output unit 122 may be constituted with a speaker module that audibly notifies the user of a charging process. The emergency button unit 124 is used to stop the charging by the pressing of a button performed by the user when an emergency occurs during the charging process.

The connector holder 130 is configured to accommodate the connector 151 of the charging cable 150 therein, and may be formed at a predetermined height on the front side of the main body 110.

The cable inlet/outlet part 140 holds and fixes the charging cable 150 at a predetermined height such that the charging cable 150 does not contact with the ground when being left in a non-use state, and discharges or collects the charging cable 150 during the charging operation. That is, when the user uses the charging cable 150 to charge his/her electric vehicle, the cable inlet/outlet part 140 discharges the charging cable 150 by a certain length to the front side of the main body 110. Further, when the charging operation is completed, the cable inlet/outlet part 140 collects the charging cable 150 to the original position.

Accordingly, the cable inlet/outlet part 140 determinates whether the charging cable 150 is in use or not in use, and automatically discharges or collects the charging cable 150 based on the result of the determination. This makes it possible for the user to easily pull out the charging cable 150 to his/her electric vehicle without any effort. In the figures of the present example embodiment, the configuration in which the cable inlet/outlet part 140 is arranged outside the main body 110 is illustrated. However, the cable inlet/outlet part 140 may be arranged inside the main body 110. Further, the cable inlet/outlet part 140 is preferably arranged in an upper region of the main body 110 as much as possible such that the cable inlet/outlet part 140 may be drawn out at a sufficient length.

The charging cable 150 is configured to feed external electric power supplied to the electric vehicle rapid charger 100 to the electric vehicle, and has a rear end portion that is electrically connected to a power supply module through the cable connection part 111 of the main body 110, an intermediate portion coupled to the cable inlet/outlet part 140 so as pass through the cable inlet/outlet part 140, and a leading end portion in which a connector 151 connected to a connection inlet of the electric vehicle is installed. In the charging cable 150 configured as above, multiple conductive wires, such as a power line for rapid charging, a signal line for charging control and the like, are accommodated in a shell made of an insulating material. Further, a cooling line for cooling the power line may be accommodated in the shell. In particular, the charging cable 150 of the present example embodiment may include a rapid charging cable having a larger diameter than a slow charging cable to sufficiently feed the electric power. The rapid charging cable may have a diameter of 30 mm or more according to the amount of electric power.

The cable connection part 111 and the cable inlet/outlet part 140 are provided in the main body 110 at predetermined heights while being spaced apart from each other at a predetermined interval. Thus, the charging cable 150 extends up and down while being stretched downward between the cable connection part 111 and the cable inlet/outlet part 140. As a result, the charging cable 150 may be stored and arranged at a sufficient length. By holding the charging cable 150 to extend up and down, the charging cable 150 may be drawn out at a sufficient length to the front side of the main body 110.

In the case of charging an electric vehicle 200, the electric vehicle 200 is spaced apart from the electric vehicle rapid charger 100 at a certain distance. For this reason, in order to charge the electric vehicle 200, the charging cable 150 is required to be drawn out to the front side of the main body 110 at a sufficient length.

Referring to FIG. 2, in the case of charging the electric vehicle 200 using the electric vehicle rapid charger 100, the user separates the connector 151 of the charging cable 150 from the connector holder 130, draws out the charging cable 150 supported by the cable inlet/outlet part 140 from the main body 110, and connects the connector 151 to the connection inlet 210 of the electric vehicle 200. At this time, since the drawing-out of the charging cable 150 from the cable inlet/outlet part 140 is automatically performed, the user may easily perform the drawing-out operation. Further, the charging cable 150 is not brought into contact with the ground and no external force acts on the charging cable 150. Thus, safety is ensured in the charging process.

Figure 3:
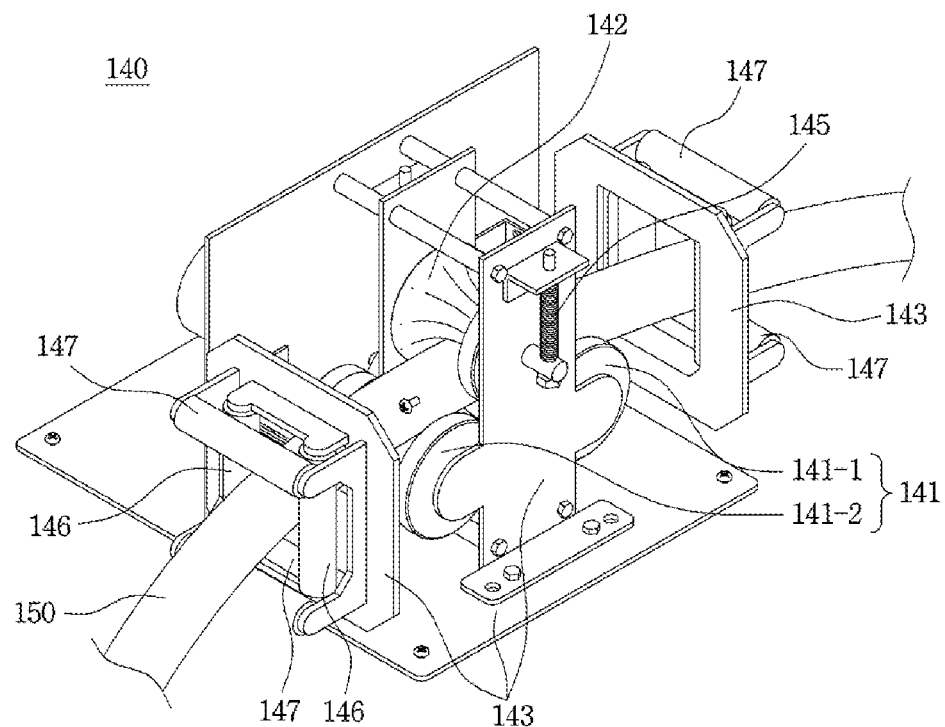
FIG. 3 is a perspective view illustrating a main part of a cable inlet/outlet part according to an example embodiment.
Figure 4:
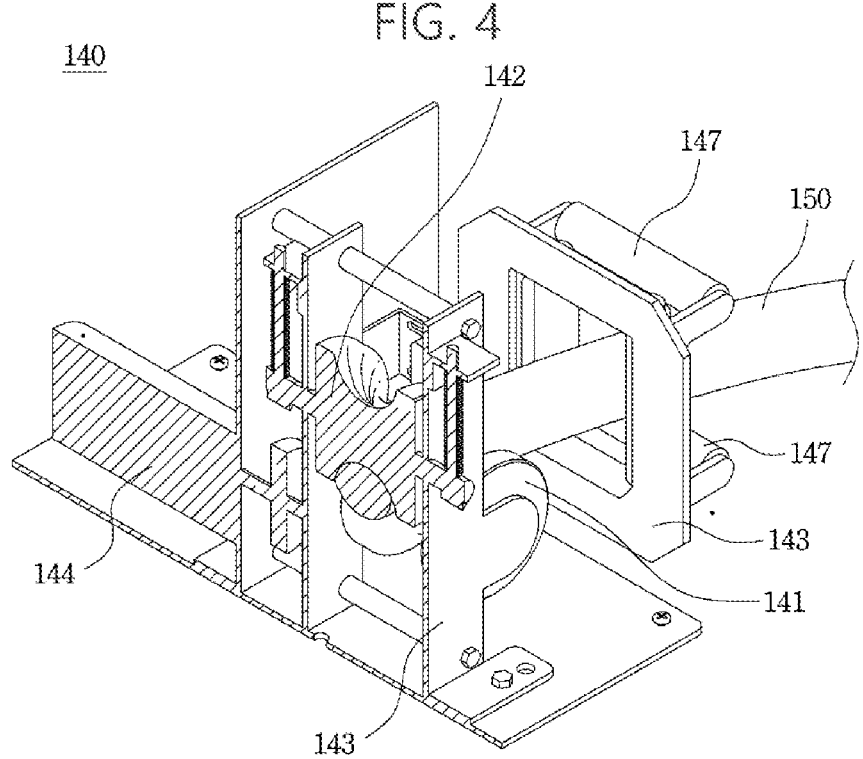
FIGS. 4 and 5 are cross-sectional views illustrating the cable inlet/outlet part of FIG. 3.
Figure 5:
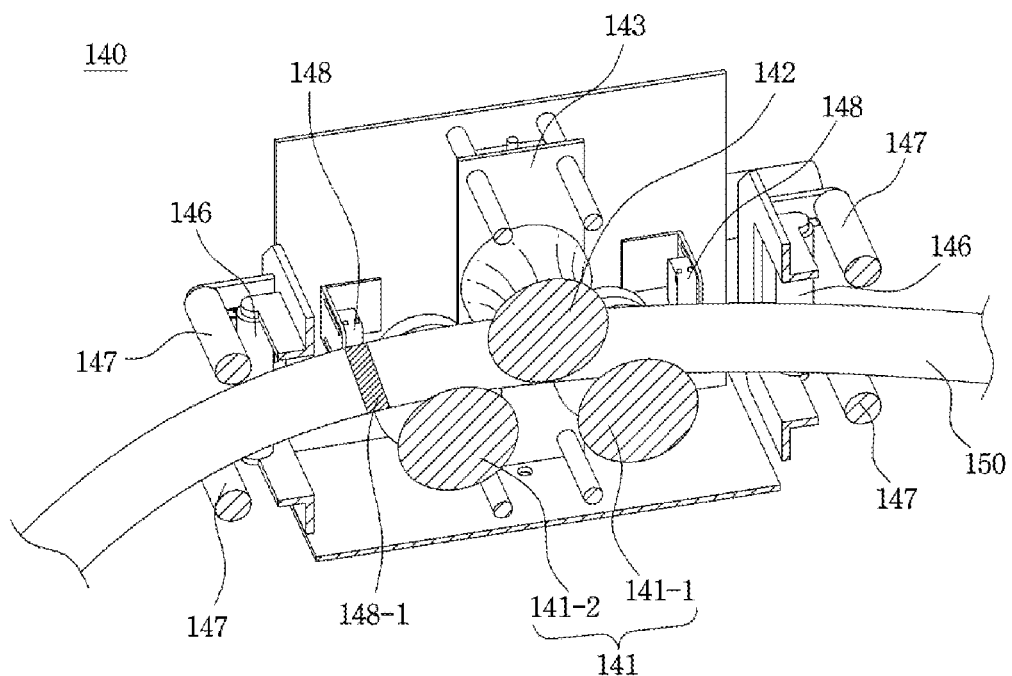
Figure 6:
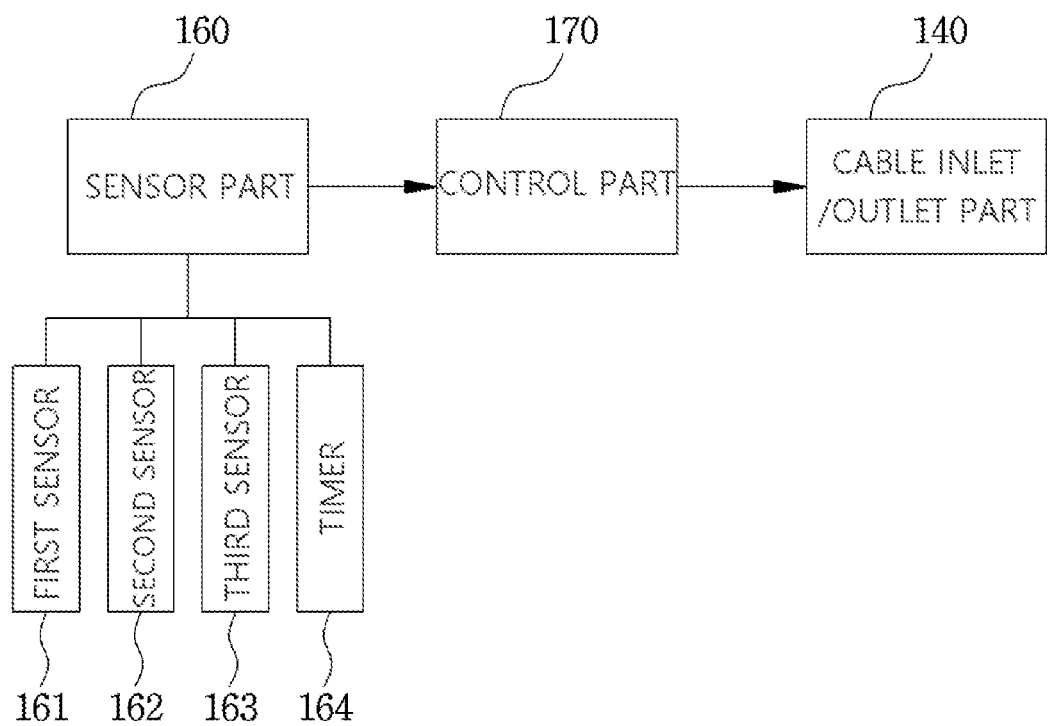
FIG. 6 is a block diagram illustrating a main configuration of the rapid charger according to the example embodiment.

FIG. 3 is a perspective view illustrating a main part of a cable inlet/outlet part 140 according to the present example embodiment. FIGS. 4 and 5 are cross-sectional views illustrating the cable inlet/outlet part 140 of FIG. 3. FIG. 6 is a block diagram illustrating main constituent elements of the electric vehicle rapid charger 100 according to the present example embodiment. The cable inlet/outlet part 140 of the present example embodiment includes a plurality of rotating rollers and a plurality of guide pins.

Specifically, as illustrated in FIGS. 3 to 5, the cable inlet/outlet part 140 includes a drive roller 141, and a pressing roller 142 spaced apart at a certain distance from the drive roller 141. The drive roller 141 and the pressing roller 142 are coupled to and supported by support plates 143 disposed at both sides of the cable inlet/outlet part 140. A drive module 144 is connected to the drive roller 141 to rotate the drive roller 141. A pressing module 145 is connected to the pressing roller 142 to press the pressing roller 142. The drive module 144 may be a motor, and the pressing module 145 may be an elastic spring.

In the cable inlet/outlet part 140 configured as above, the charging cable 150 is inserted between the drive roller 141 and the pressing roller 142. The charging cable 150 is in a state of being pressed by the pressing roller 142. Thus, the charging cable 150 is discharged to the front side of the main body 110 or collected to the rear side of the main body 110 along the rotational direction of the drive roller 141.

Although the configuration in which the drive roller 141 and the pressing roller 142 are coupled to each other is illustrated in the present example embodiment, the pressing roller 142 may be replaced with the drive roller 141, and thus the charging cable 150 may be controlled to be moved forward and backward while being inserted between the pair of drive rollers 141. Further, as illustrated in the figures, the drive roller 141 may be constituted with a plurality of drive rollers, for example, a first drive roller 141-1 and a second drive roller 141-2, which are arranged side by side.

The cable inlet/outlet part 140 may further include a pair of vertical guide pins 146 and a pair of horizontal guide pins 147 which guide the movement of the charging cable 150. The pair of vertical guide pins 146 and the pair of horizontal guide pins 14 7 are coupled to the support plates 143 in front and back sides of the drive roller 141 or the pressing roller 142 along a path through which the charging cable 150 moves.

The pair of vertical guide fins 146 are coupled to the support plate 143 in the vertical direction at left and right sides of the charging cable 150 so as to prevent the charging cable 150 from fluctuating in the lateral direction or being displaced from a normal position when moving forward and backward between the pair of vertical guide fins 146. Further, the pair of horizontal guide pins 147 are coupled to the support plate 143 in the horizontal direction at upper and lower sides of the charging cable 150 so as prevent the charging cable 150 from fluctuating in the vertical direction or being displaced from the normal position when moving forward and backward between the pair of horizontal guide pins 147.

The charging cable 150 having a predetermined diameter may be finely twisted or wrenched when the discharging and collection are repeated. Due to such twist and wrench, the charging cable 150 tends to be displaced from the normal position between the drive roller 141 and the pressing roller 142. The pair of vertical guide pins 146 and the pair of horizontal guide pins 147 prevent such a displacement of the charging cable 150. With this configuration, the charging cable 150 is guided at the normal position by the pair of vertical guide pins 146 and the pair of horizontal guide pins 14 7 which are arranged on the rear side, is inserted between the drive roller 141 and the pressing roller 142 and discharged therefrom, and then is guided up to the pair of vertical guide pins 146 and the pair of horizontal guide pins 147 which are arranged on the front side. Thus, the charging cable 150 may be discharged and collected in a stable manner while maintaining the normal position between the drive roller 141 and the pressing roller 142.

In addition, the cable inlet/outlet part 140 may further include a sensor module 148 configured to sense a length at which the charging cable 150 is discharged or collected. Based on a signal indicating the length sensed by the sensor module 148, the cable inlet/outlet part 140 limits a length at which the charging cable 150 is to be discharged or collected, which makes it possible to discharge or collect the charging cable 150 without making contact with the ground.

The sensor module 148 may be coupled to a specific position of the support plate 143. The sensor module 148 senses the length at which the charging cable 150 is discharged or collected to send the signal indicating the sensed length to the drive module 144. The drive module 144 stops the driving of the drive roller 141 based on the signal provided from the sensor module 148.

The sensor module 148 may be constituted with various kinds of sensors configured to sense the movement of the charging cable 150. As an example, the sensor module 148 may be a color sensor. A sensing portion 148-1, such as a locking protrusion or a region marked in a color different from that of the charging cable 150, may be formed at a specific position on the charging cable 150 such that the sensor module 148 may sense the movement of the charging cable 150. In the case in which the sensor module 148 is constituted with a color sensing sensor, no locking protrusion is formed in the charging cable 150. Thus, there are advantages in that the movement of the charging cable 150 is not disturbed and the sensor module 148 may be implemented at a low cost. The sensor module 148 may be a stopper module, such as a limited switch, instead of the color sensor. Various means may be used as the sensor module 148 as long as they may limit a discharge length of the charging cable 150.

Referring to FIG. 6, the electric vehicle rapid charger 100 includes, as a control module for controlling the driving of the drive module 144 of the cable inlet/outlet part 140, that is, the rotation of the drive roller 141, a sensor part 160 configured to sense whether the charging cable 150 is in use or not in use and a control part 170 configured to control the driving of the drive module 144 based on a signal sensed by the sensor part 160.

The sensor part 160 may include a first sensor 161 configured to sense a connection state of the connector 151 and the connector holder 130, a second sensor 162 configured to sense a connection state of the connector 151 and the connection let 210 of the electric vehicle 200, a third sensor 163 configured to sense whether or not the charging cable 150 is abnormally discharged, and a timer 164.

The first sensor 161 may be provided between the connector 151 and the connector holder 130 to sense whether or not the connector 151 is separated from the connector holder 130 and whether or not the connector 151 is held by the connector holder 130. When the user separates the connector 151 from the connector holder 130 to use the charging cable 150, the first sensor 161 senses the separation state and the control part 170 drives the drive roller 141 to discharge the charging cable 150.

In addition, the second sensor 162 may be provided between the connector 151 and the connection inlet 210 to sense whether or not the connector 151 is connected to the connection inlet 210 and whether or not the connector 151 is separated from the connection inlet 210. When the user connects the connector 151 to the connection inlet 210 to start the charging of the electric vehicle 200, the second sensor 162 senses the connection state and the control part 170 stops the driving of the drive roller 141 because it is no longer required to discharge the charging cable 150. Thus, the discharge of the charging cable 150 is stopped.

In addition, when the charging of the electric vehicle 200 is completed, the user separates the connector 151 from the connection inlet 210 and the second sensor 162 senses the separation state. In this case, since the charging cable 150 is required to be collected to its original position, the control part 1 70 drives the drive roller 141 to collect the charging cable 150.

The third sensor 163 may be provided in the cable inlet/outlet part 140 or the charging cable 150 to sense that the charging cable 150 is abnormally discharged by an excessively strong force. When a strong external force acts on the charging cable 150, the third sensor 163 senses such a situation and the control part 170 ceases the driving of the drive roller 141 to stop the discharge of the charging cable 150.

Further, the charging cable 150 may be configured to be discharged or collected merely for a predetermined period of time. That is, the timer 164 senses a time at which the charging cable 150 starts to be discharged or collected.

When it is determined by the timer 164 that the predetermined period of time has elapsed, the control part 170 ceases the driving of the drive roller 141 to stop the discharge or collection of the charging cable 150.

In the electric vehicle rapid charger 100 configured as above, the charging cable 150 may be arranged without coming in contact with the ground during charging. This prevents contamination or damage to the charging cable 150. Further, by automatically discharging and collecting the thick and heavy charging cable, it is possible to greatly improve the usability of the charging cable by the user.

While the exemplary example embodiments of the present disclosure have been described above, various modifications and other example embodiments may be made by those skilled in the art. It needs to be construed that these modifications and other example embodiments are included within the scope of the appended claims without departing from the true spirit and scope of the present disclosure.

What is claimed is:

1. An electric vehicle rapid changer, comprising:
   a main body including a connector holder provided on one side of the main body and a cable connection part provided at a first predetermined height;
   a cable inlet/outlet part including a plurality of rotating rollers and fixedly coupled to the main body at a second predetermined height;
   a charging cable having a leading end portion in which a connector connected to a connection inlet of an electric vehicle is provided, a rear end portion fixedly coupled to the cable connection part, and an intermediate portion coupled to the cable inlet/outlet part to be inserted between the plurality of rotating rollers, wherein the charging cable extends downward between the cable connection part and the cable inlet/outlet part at a length;
   a sensor part including a first sensor configured to sense a coupling between the connector of the charging cable and the connector holder of the main body, and a second sensor configured to sense a coupling between the connector of the charging cable and the connection inlet of the electric vehicle, the sensor part configured to sense a charging request signal or a charging stop signal when using the charging cable; and
   a control part configured to control a driving of the cable inlet/outlet part according to the charging request signal or the charging stop signal sensed by the sensor part,
   wherein the cable inlet/outlet part includes guide pins arranged on a front side or a rear side of the plurality of rotating rollers to guide the charging cable to move between the plurality of rotating rollers at a normal position, and is configured to continuously discharge or collect the charging cable by a driving of the plurality of rotating rollers, and
   wherein each of the guide pins include:
   a pair of vertical guide fins arranged on right and left sides of the charging cable to prevent the charging cable from being displaced in a lateral direction, and a pair of horizontal guide fins arranged on upper and lower sides of the charging cable to prevent the charging cable from being displaced in a vertical direction,
   wherein, when the sensor part senses the charging request signal, the cable inlet/outlet part is configured to move upward the charging cable, which has been discharged downward between the cable connection part and the cable inlet/outlet part, by the driving of the plurality of rotating rollers such that the charging cable is discharged to a front side of the cable inlet/outlet part, and when the sensor part senses the charging stop signal, the cable inlet/outlet part is configured to move downward the charging cable between the cable connection part and the cable inlet/outlet part by the driving of the plurality of rotating rollers such that the charging cable is collected to an origin position;
   wherein the sensor part further includes a third sensor configured to sense whether or not the charging cable is abnormally discharged by an external force; and
   wherein, when the third sensor senses the charging cable being abnormally discharged, the control part is configured to stop the driving of the cable inlet/outlet part to prevent the charging cable from being discharged.

2. The electric vehicle rapid changer of claim 1, wherein the cable inlet/outlet part further includes: a sensor module configured to sense a length at which the charging cable is discharged or collected such that the charging cable is discharged or collected within a certain range of length.

3. The electric vehicle rapid changer of claim 2, wherein the sensor module includes a color sensor coupled to the cable inlet/outlet part and a color portion formed in a surface of the charging cable.

* * * * *